No. 821,634. PATENTED MAY 29, 1906.
H. GRIMES.
SNOW PLOW.
APPLICATION FILED FEB. 2, 1906.
2 SHEETS—SHEET 2.
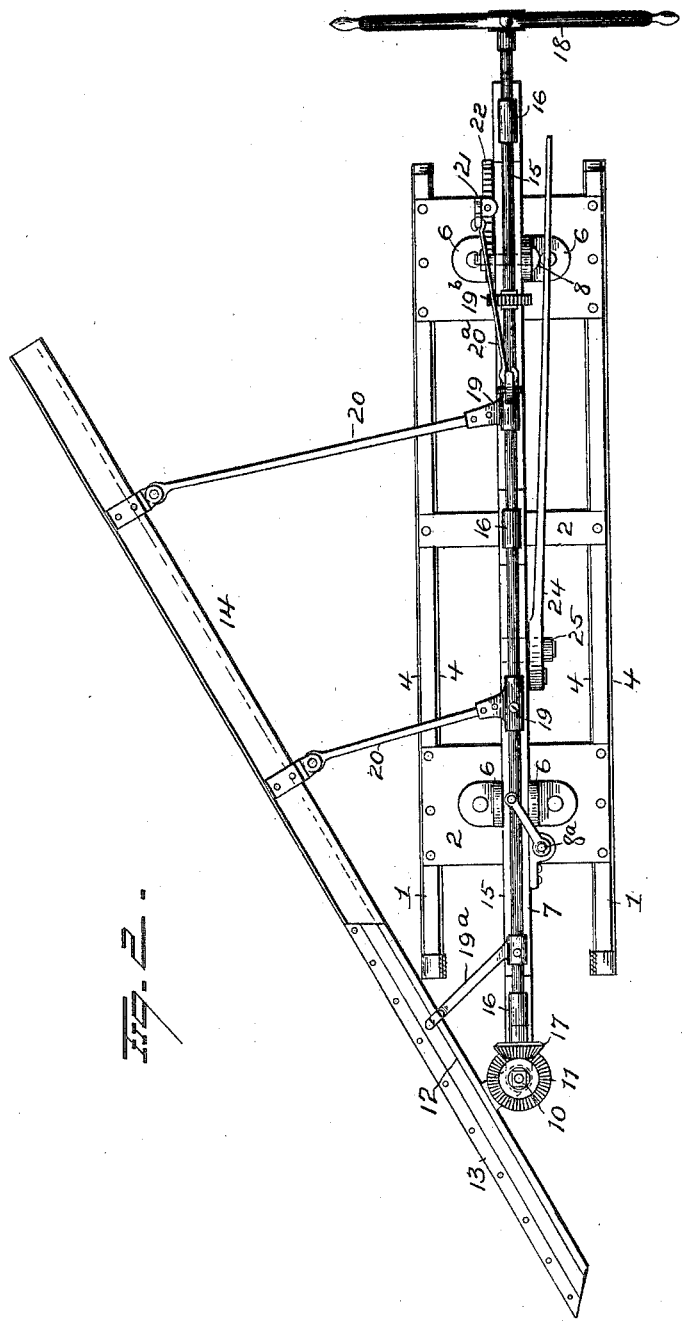
WITNESSES
E. J. Nottingham
G. F. Downing
INVENTOR
Howard Grimes
By H. A. Seymour
Attorney

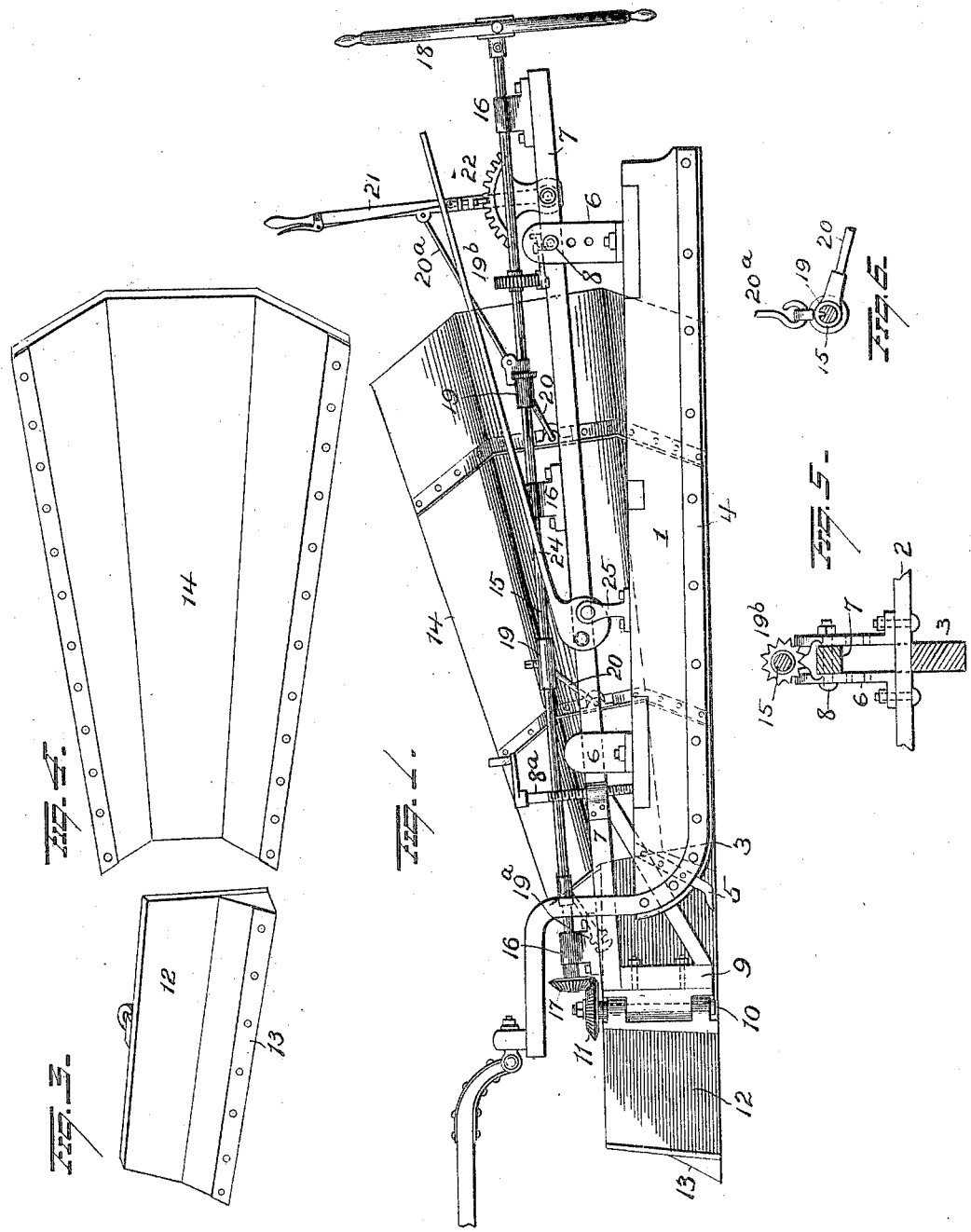

UNITED STATES PATENT OFFICE.

HOWARD GRIMES, OF NEWCOMB, NEW YORK.

SNOW-PLOW.

No. 821,634.  Specification of Letters Patent.  Patented May 29, 1906.

Application filed February 2, 1906. Serial No. 299,202.

*To all whom it may concern:*

Be it known that I, HOWARD GRIMES, a resident of Newcomb, in the county of Essex and State of New York, have invented certain new and useful Improvements in Snow-Plows; and I do hereby declare the following to be a full, clear, and exact description of the invention, such as will enable others skilled in the art to which it appertains to make and use the same.

My invention relates to improvements in snow-plows, and more particularly to improvements of this character especially designed for cleaning sidewalks, the object of the invention being to provide improved mechanism for reversing the moldboard and plow to permit the snow to be thrown to either side, improved mounting for the plow and operating mechanism which permits of careful adjustment to suit any and all conditions, and improved mechanism for throwing the plow out of operation when being moved from place to place.

With these and other objects in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a top plan view, and Figs. 3, 4, 5, and 6 are views of various details of construction.

1 1 represent parallel runners connected by cross-bars 2 and constituting a sled supporting my improvements, and a central runner 3 may be provided, if desired. To opposite sides of runners 1 metal strips 4 are secured and extend below the lower edge of the runners to cut into the ice or snow and prevent sluing of the sled, and the ice prong or cutter 5 may be secured to the forward end of central runner 3 to cut a groove in the ice for runner 3 to move through, and thereby hold the sled true.

The cross-bars 2 have forked brackets 6 secured thereon, and a longitudinal bar 7 is mounted in these brackets 6 and pivoted to the rear bracket by a pin 8, which may be located in any of a vertical series of holes in the bracket to adjust the rear end of the bar vertically. A screw $8^a$ supports the forward end of bar 7 to adjust the bar vertically and exactly position the plow for the work to be done.

A bracket 9 is secured to the forward end of bar 7 and provides rotary mounting for a vertical shaft 10, having a beveled gear 11 secured on its upper end, and a plow 12 is secured between its ends to the shaft 10, and when the shaft is turned the angle of plow 12 will be adjusted. This plow 12 is made with a beveled ice-scraper 13 at its lower edge, and its ends are preferably inclined to fit the incline of a moldboard 14.

A longitudinal shaft 15 is supported in bearings 16 on bar 7 and carries a beveled gear 17 at its forward end, meshing with gear 11, and a large hand-wheel 18 is secured on the rear end of the shaft to turn the same. Sleeves 19 are located on this shaft 15 and connected by links 20 with moldboard 14, the forward sleeve 19 being rigidly secured to the shaft and the rear sleeve 19 keyed to slide on the shaft and connected by a rod 20 with a hand-lever 21, fulcrumed on bar 7 and provided with a detent to lock in any of the notches of a segment 22, also secured to bar 7, and it will be seen that by moving this lever 21 to slide the rear sleeve 19 on shaft 15 the angle of the moldboard will be adjusted to clean just the proper width, and by turning hand-wheel 18 the moldboard 14 will be moved over to the other side of the sled and the plow 12 will be turned to its opposite angle to meet the moldboard and throw the snow to the opposite side. A ratchet-wheel $19^b$ and pawl are provided to lock the shaft 15 at any adjustment, and a brace-bar $19^a$ is secured to shaft 15 and movable therewith to engage the plow 12 at either side and effectually brace the same.

A lever 24 is supported on bar 7 and connected by a link or links 25 with the sled, so that by moving this lever 24 the bar 7 and plows carried thereby can be elevated or lowered at the will of the operator.

The moldboard is made preferably dished, as shown, and with double inclined or notched end, so as to fit the plow at both sides of the sled and operate with equal effectiveness in either position.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what

I claim as new, and desire to secure by Letters Patent, is—

1. The combination with a sled, of a plow across the front thereof, and means for changing the position of the plow to throw to either side.

2. The combination with a sled, of a plow across the front thereof, a moldboard, and means for moving the plow and moldboard to throw to either side.

3. In a snow-plow, the combination with a sled, of a plow across the front thereof, a moldboard at the side of the sled and forming a continuation of the plow, and means for simultaneously shifting the plow and moldboard to throw the snow to the opposite side of the sled.

4. In a snow-plow, the combination with a sled, of a plow across the front thereof, a vertical shaft supporting the plow between the ends of the latter to tilt the plow to either side, a moldboard, and means for swinging the moldboard to either side of the sled simultaneously with the movement of the plow.

5. In a snow-plow, the combination with a sled, of a vertical shaft at the front end of the sled, a horizontal plow secured between its ends to the vertical shaft, a gear-wheel on the upper end of the shaft, a longitudinal shaft on the sled, a gear-wheel thereon meshing with the first-mentioned gear-wheel, a moldboard, and links connecting the same with the longitudinal shaft so that when the shaft is turned to move the plow to its opposite position, the moldboard will be swung over to the other side of the sled in operative position.

6. In a snow-plow, the combination with a sled, of a central longitudinal bar supported on the sled, a horizontal plow supported by the forward end of the bar, and means for vertically moving the bar and parts carried thereby.

7. In a snow-plow, the combination with a sled, of a central longitudinal bar supported on the sled, a horizontal plow, a vertical shaft carried by the bar and to which the plow is secured midway its ends, a gear on the upper end of the shaft, a longitudinal shaft supported on the bar, a gear thereon meshing with the first-mentioned gear, and a moldboard secured to the longitudinal shaft.

8. In a snow-plow, the combination with a sled, of a longitudinal shaft thereon, a plow across the front of the sled, a moldboard, links connecting the moldboard with sleeves on the shaft, one of said sleeves keyed to slide on the shaft, and a lever constructed to adjust the sleeve on the shaft to change the angle of the moldboard and regulate the width of the path plowed.

9. In a snow-plow, the combination with a sled, of a longitudinal bar thereon, a plow across the front of the sled secured to the bar, a shaft on said bar, a moldboard secured to the shaft, and a lever constructed to raise and lower the bar and move the plow and moldboard out of or into operative position, and a screw to adjust the position of the bar with relation to the sled.

10. In a snow-plow, the combination with a sled, of a longitudinal bar thereon and pivotally secured near its rear end, a vertical shaft at the forward end of the bar, a horizontal plow secured between its ends on the shaft, a gear-wheel on the upper end of the shaft, a longitudinal shaft supported on the bar, a gear on the forward end of the longitudinal shaft meshing with the first-mentioned gear, a hand-wheel on the rear end of the shaft to turn the same and change the angle of the plow to throw to either side, a moldboard and links connecting the same with the longitudinal shaft so that the moldboard will be swung to either side of the sled as the plow is turned, and ratchet means for locking the shaft against movement.

In testimony whereof I have signed this specification in the presence of two subscribing witnesses.

HOWARD GRIMES.

Witnesses:
THOMAS McAVEIGH,
PATRICK J. TUMMINS.